US012809299B2

(12) United States Patent
Matsumoto

(10) Patent No.: US 12,809,299 B2
(45) Date of Patent: Nov. 24, 2026

(54) SHEET FEEDING DEVICE AND IMAGE FORMING APPARATUS THEREWITH

(71) Applicant: KYOCERA Document Solutions Inc., Osaka (JP)

(72) Inventor: Hiromu Matsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/195,973

(22) Filed: May 1, 2025

(65) Prior Publication Data

US 2025/0348036 A1 Nov. 13, 2025

(30) Foreign Application Priority Data

May 13, 2024 (JP) ................................ 2024-078093

(51) Int. Cl.
*G03G 15/00* (2006.01)

(52) U.S. Cl.
CPC .................... *G03G 15/6511* (2013.01); *G03G 2215/00616* (2013.01); *G03G 2215/00725* (2013.01)

(58) Field of Classification Search
CPC ............ B65H 3/5223; B65H 2403/512; B65H 2403/514; B65H 2404/1113; B65H 2405/1117
See application file for complete search history.

(56) References Cited

U.S. PATENT DOCUMENTS

| | | | | |
|---|---|---|---|---|
| 7,111,934 B2 * | 9/2006 | Okuda | B41J 3/4071 271/167 |
| 7,364,152 B2 * | 4/2008 | Suwa | B65H 1/08 271/118 |
| 8,757,616 B2 * | 6/2014 | Arimura | B65H 3/0684 271/121 |
| 2006/0180988 A1 | 8/2006 | Yorimoto et al. | 271/119 |

FOREIGN PATENT DOCUMENTS

| | | | |
|---|---|---|---|
| JP | 2006-124084 A | | 5/2006 |
| JP | 2015020879 A | * | 2/2015 |

OTHER PUBLICATIONS

Translation of JP-2015020879-A (Year: 2026).*

* cited by examiner

*Primary Examiner* — Howard J Sanders
(74) *Attorney, Agent, or Firm* — Stein IP, LLC

(57) ABSTRACT

A sheet feeding device has a sheet stacking tray, a sheet stop portion, a sheet feed roller, a separation member, a first urging member, an eccentric cam, a cam follower, a sheet detection mechanism, and a holding mechanism. The holding mechanism holds the separation member at a position away from the sheet feed roller after a half-moon-shaped feed surface has passed across the separation member as the sheet feed roller rotates. Immediately before a sheet starts to be fed, the sheet stacking tray is kept on standby at a standby position radially inward of the outer diameter of the feed surface so that the feedable distance between the feed start position and the sheet stop portion is larger than the detectable distance as the maximum distance between the detectable position at which the sheet can be detected by the sheet detection mechanism and the sheet stop portion.

5 Claims, 9 Drawing Sheets

-Related art-

-Related art-

-Related art-

SHEET FEEDING DEVICE AND IMAGE FORMING APPARATUS THEREWITH

INCORPORATION BY REFERENCE

This application is based on and claims the benefit of priority from Japanese Patent Application No. 2024-078093 filed on May 13, 2024, the contents of which are hereby incorporated by reference.

BACKGROUND

The present disclosure relates to a sheet feeding device that feeds sheets such as sheets of paper, and also relates to an image forming apparatus provided with a sheet feeding device.

In image forming apparatuses such as copiers and printers, there are known sheet feeding devices that feed sheets such as cut paper sheets. Sheet feeding devices are generally configured to achieve feeding by pressing the topmost surface of a bundle of stacked sheets against a pickup roller.

As an example of a sheet feeding device, there is known a sheet feeding device including a sheet feed roller (half-moon roller) that is formed in a shape with part of a circular cross section cut out so as to feed sheets of paper, and a pressing plate that is provided so as to be urged toward the sheet feed roller by an urging means and that presses the stacked sheets against the sheet feed roller with a cam, clutch, or the like in synchronization with one turn of the sheet feed roller.

SUMMARY

According to one aspect of the present disclosure, a sheet feeding device includes a sheet stacking tray, a sheet stop portion, a sheet feed roller, a separation member, a first urging member, an eccentric cam, a cam follower, a sheet detection mechanism, and a holding mechanism. The sheet stacking tray is movable up and down and, on it, a sheet is stacked. Against the sheet stop portion, the leading end of the sheet stacked on the sheet stacking tray is thrust to be aligned. The sheet feed roller is kept in pressed contact with the top surface of the sheet stacked on the sheet stacking tray and has a half-moon-shaped feed surface that feeds out the sheet in a feed direction. The separation member contacts the feed surface of the sheet feed roller to form a feed nip. The first urging member urges the sheet stacking tray in a direction toward the sheet feed roller. The eccentric cam is fixed to a rotating shaft of the sheet feed roller and has a maximum eccentric radius larger than the radius of the sheet feed roller. The cam follower is provided at a position in the sheet stacking tray where the cam follower contacts the eccentric cam and raises the sheet stacking tray by moving the contact point from a large-diameter portion of the eccentric cam to a small-diameter portion of the eccentric cam as the eccentric cam rotates. The sheet detection mechanism includes a sheet detection sensor that includes a detection portion having a light emitting portion and a light receiving portion and a detection member that makes contact with the sheet stacked on the sheet stacking tray to swing and that has a light-shielding portion that shields or opens the optical path of the detection portion. The sheet detection mechanism detects the sheet stacked on the sheet stacking tray. The holding mechanism holds the separation member at a position away from the sheet feed roller after the feed surface has passed across the separation member as the sheet feed roller rotates. Immediately before the sheet starts to be fed, the sheet stacking tray is kept on standby at a standby position radially inward of the outer diameter of the feed surface so that the feedable distance, which is the distance between the feed start position that at which the feed surface and the sheet stacking tray are in contact with each other and the sheet stop portion, is larger than the detectable distance, which is the maximum distance between the detectable position at which, with the leading end of the sheet separated from the sheet stop portion, the sheet can be detected by the sheet detection mechanism and the sheet stop portion.

DETAILED DESCRIPTION

1. Configuration of an Image Forming Apparatus

Figure 1:
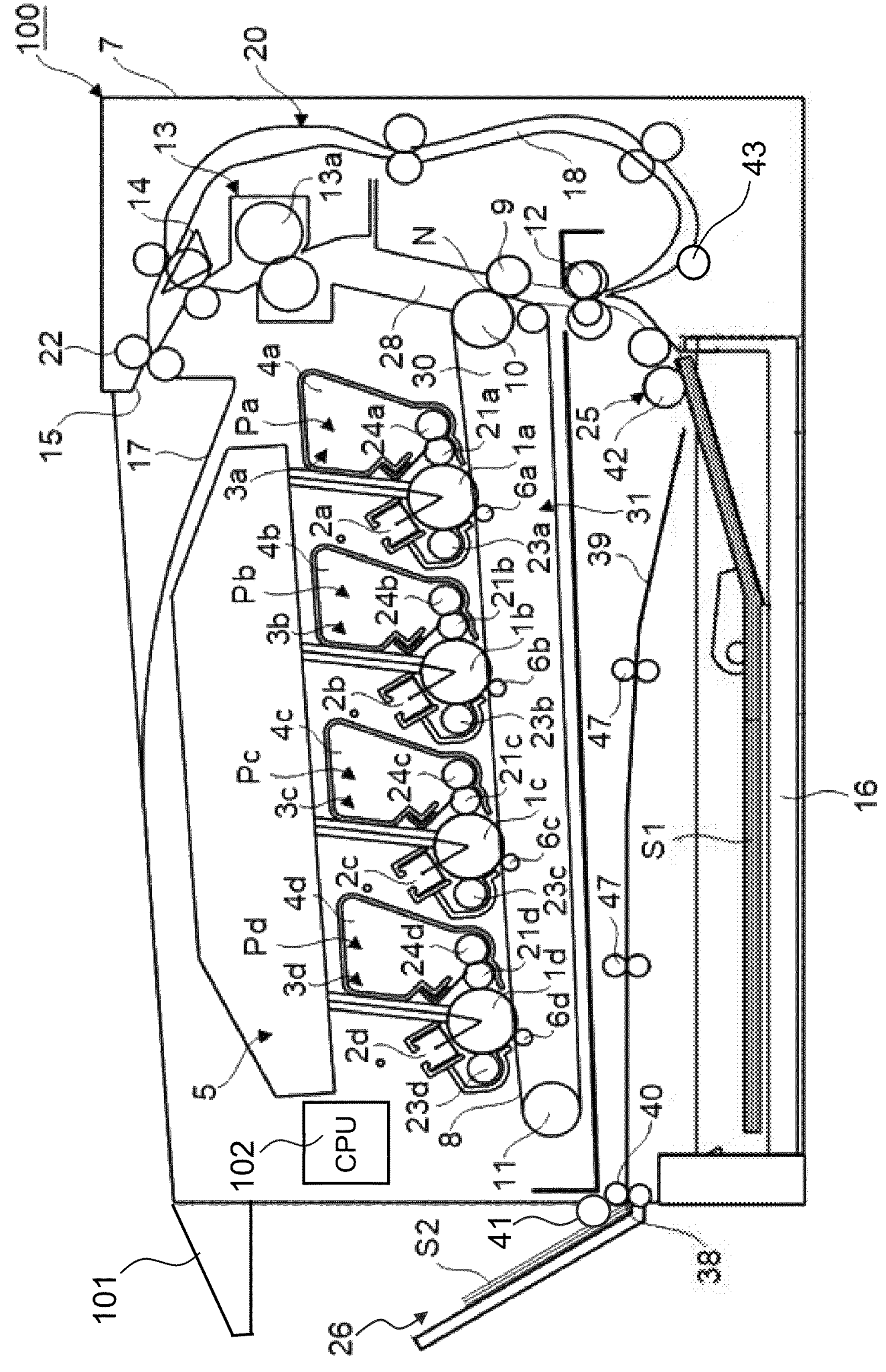
FIG. 1 is a schematic sectional view showing the internal construction of an image forming apparatus including a manual sheet feed portion according to one embodiment of the present disclosure.

An embodiment of the present disclosure will be described below with reference to the accompanying drawings. FIG. 1 is a schematic sectional view showing the internal construction of an image forming apparatus 100 including a manual sheet feed portion 26 according to one embodiment of the present disclosure. The image forming apparatus 100 shown in FIG. 1 is what is called a tandem-type color printer.

In an apparatus body 7 of the image forming apparatus 100, image forming portions Pa to Pd are provided side by side along a horizontal direction. The image forming portions Pa to Pd sequentially form a yellow, a magenta, a cyan, and a black image respectively through the processes of electrostatic charging, exposure to light, image development, and image transfer. The image forming portions Pa to Pd are provided to correspond to images of the different colors respectively. The following description focuses on the image forming portion Pa, and for the image forming portions Pb to Pd, which are configured similarly to it, no separate description will be given.

The image forming portion Pa includes a photosensitive drum 1*a* that carries a visible image (toner image). Above the image forming portion Pa, an exposure device 5 is disposed. The exposure device 5 shines a light beam onto the surfaces of the photosensitive drums 1*a* to 1*d* to form electrostatic latent images. Around the photosensitive drum 1*a*, along the drum rotation direction (clockwise in FIG. 1), there are arranged a charging device 2*a*, a developing device 3*a*, and a rubbing roller 23*a*.

The charging device 2*a* is disposed opposite the photosensitive drum 1*a* and can electrostatically charge the surface of the photosensitive drum 1*a*. The developing device 3*a* includes a developer container 4*a*, a developing roller 21*a*, and a feed roller 24*a*. The developing container 4*a* is loaded with a predetermined amount of toner. The toner loaded in the developing containers 4*a* to 4*d* is yellow, magenta, cyan, or black tonner for the developing devices 3*a* to 3*d*. The developing roller 21*a* is disposed opposite the photosensitive drum 1*a*. The feed roller 24*a* feeds the toner in the developing container 4*a* to the outer circumference surface to the developing roller 21*a*. The developing roller 21*a* can feed the toner fed to the outer circumference surface thereof to the photosensitive drum 1*a*.

Below the photosensitive drums 1*a* to 1*d*, an intermediate transfer unit 31 is provided. The intermediate transfer unit 31 includes a frame 30, a driving roller 10, a tension roller 11, an intermediate transfer belt 8, and primary transfer rollers 6*a* to 6*d*.

The frame 30 extends along the width direction of the image forming apparatus 100 (the left-right direction in FIG. 1). The driving roller 10 and the tension roller 11 are rotatably supported at the opposite ends of the frame 30 in its longitudinal direction.

The intermediate transfer belt 8 is an endless belt (preferably a seamless belt with no seams). The intermediate transfer belt 8 is stretched from the tension roller 11 to the drive roller 10 so as to be rotatable in the circumferential direction.

The driving roller 10 is connected to a belt driving motor (not illustrated). As the driving roller 10 rotates with a rotary driving force from the belt driving motor, by a frictional force, the rotary driving force is transmitted to the intermediate transfer belt 8. As a result, the intermediate transfer belt 8 rotates in the same direction as the rotation direction of the driving roller 10.

The primary transfer rollers 6*a* to 6*d* are supported on the frame 30 so as to be rotatable relative to it, at positions opposite the photosensitive drums 1*a* to 1*d* across the intermediate transfer belt 8.

A secondary transfer roller 9 is provided opposite the drive roller 10 across the intermediate transfer belt 8. The secondary transfer roller 9 is kept in pressed contact with the intermediate transfer belt 8 to form a secondary transfer nip N. The secondary transfer roller 9 secondarily transfers the toner images formed on the intermediate transfer belt 8 to a sheet S1 or S2 that passes through the secondary transfer nip N.

In the image forming apparatus 100, to a side of the image forming portions Pa to Pd and the intermediate transfer belt 8, there are disposed a sheet conveyance passage 20, a pair of registration rollers 12, a sheet cassette 16, a sheet feed portion 25, and a manual sheet feed portion 26.

The sheet conveyance passage 20 includes a main conveyance passage 28 and a duplex conveyance passage 18. The main conveyance passage 28 extends in the up-down direction. Halfway along the main conveyance passage 28, the pair of registration roller pairs 12, the secondary transfer roller 9, and a fixing device 13 are disposed. The main conveyance passage 28 conveys a sheet S1 or a sheet S2 from the manual feed sheet portion 26 and the sheet cassette 16, which will be described later, such that the sheet passes through the pair of registration rollers 12, the secondary transfer nip N, and the fixing device 13 in this order.

The pair of registration rollers aligns the conveyance direction of the sheet S1 or S2 such that its leading end (a downstream end part of it with respect to the sheet conveyance direction) is orthogonal to the sheet conveyance direction and thereby corrects slanted conveyance.

In a downstream end part of the main conveyance passage 28 with respect to the sheet conveyance direction, a sheet discharge port 15 is provided that leads to outside the image forming apparatus 100. The sheet discharge port 15 is provided with a pair of discharge rollers 22.

Between the pair of discharge rollers 22 and the fixing device 13 with respect to the sheet conveyance direction, a branch portion 14 is provided. The duplex conveyance passage 18 branches off the main conveyance passage 28 at a position overlapping with the branch portion 14 of the main conveyance passage 28 with respect to the sheet conveyance direction and re-joins the main conveyance passage 28 at a position upstream of the pair of registration rollers 12. The branch portion 14 can distribute the sheet S1 or S2 having passed through the fixing device 13 to the sheet discharge port 15 or to the duplex conveyance passage 18.

The sheet cassette 16 and the manual sheet feed portion 26 are provided upstream of the main conveyance passage 28 with respect to the sheet conveyance direction. The sheet cassette 16 can be stacked with the sheet S1 and the manual sheet feed portion 26 can be stacked with the sheet S2. The sheet feed portion 25 is disposed between, at one side, the main conveyance passage 28 and, at one other side, the sheet cassette 16 and the manual sheet feed portion 26, and feeds the sheet S1 or S2 to the main conveyance passage 28.

The sheet cassette 16 is removably mounted in the apparatus body 7; specifically, the sheet cassette 16 can be pulled out of the apparatus body 7 from a state (mounted state) where it is inserted up to the innermost of a cassette housing portion 29 with respect to the horizonal direction.

The manual sheet feed portion 26 is fitted to a side part of the apparatus body 7, between an introduction port 38 and the opening edge of a cassette housing portion 29 with respect to the up-down direction. The manual sheet feed portion 26 can be fed with, on its top surface, the sheet S2 (sheets as a recording medium such as special size sheets, cardboard sheets, envelopes, and OHP sheets.).

The introduction port 38 is provided with a pair of introduction rollers 40 and a sheet feed roller 41. The sheet feed roller 41 makes contact with a downstream end part of the sheet S2 with respect to the sheet conveyance direction. The sheet feed roller 41 and the pair of introduction rollers 40, by rotating, introduce the sheet S2 into a manual sheet feed passage 39. The feeding of the sheet S2 from the manual sheet feed portion 26 will be described in detail later.

Along the manual sheet feed passage 39, a plurality of pairs of conveyance rollers 47 are disposed at predetermined intervals with respect to the sheet conveyance direction. The pairs of conveyance rollers 47 are each a pair of rollers that face each other in the up-down direction across the manual sheet feed passage 39. The sheet S2 introduced into the manual sheet feed passage 39 is conveyed by the pairs of conveyance rollers 47 toward a pick-up roller 42.

The sheet feed portion 25 includes the pick-up roller 42 and a pair of feed rollers 43. The pick-up roller 42 is rotatably supported on a roller holder 44 (see FIG. 2) and rotates with a rotary driving force from an unillustrated driving device. The pick-up roller 42 rotates while in contact with the top surface of the sheet S1 stacked on a sheet stacking plate 37 in the sheet cassette 16 and the sheet S2 introduced into the manual sheet feed passage 39 from the manual sheet feed portion 26. In this way, the sheet S1 or S2 is fed out in the feed direction and is passed to the pair of feed rollers 43.

An operation panel 101 is disposed at the front of the imaging forming apparatus 100. The operation panel 101 is an operation portion that accepts the input of various settings. For example, a user can operate the operation panel 101 to enter information on the type of sheet. The user can also operate the operation panel 101 to input the number of sheets to be printed or to request to start a print job. A control portion 102 controls the operation of the entire imaging forming apparatus 100 and controls different blocks constituting the imaging forming apparatus 100.

Next, a description will be given of an image forming procedure on the image forming apparatus 100. When a user enters an instruction to start image formation, first, while the photosensitive drums 1*a* to 1*d* are rotated, the charging devices 2*a* to 2*d* electrostatically charge the surfaces of the photosensitive drums 1*a* to 1*d* uniformly. Next, the exposure device 5 shines light onto the surfaces of the photosensitive drums 1*a* to 1*d* so that electrostatic latent images according to an image signal are formed on the photosensitive drums 1*a* to 1*d*.

Subsequently, the toner in the development devices 3*a* to 3*d* is fed to the photosensitive drums 1*a* to 1*d* by the developing rollers 21*a* to 21*d* and electrostatically attaches to them. Thus, toner images according to the electrostatic latent images are formed on the photosensitive drums 1*a* to 1*d*.

Now, the driving roller 10 is rotated so that the intermediate transfer belt 8 starts to rotate counter-clockwise. The toner images of the different colors formed on the photosensitive drums 1*a* to 1*d* are then primarily transferred, one after the next, to the intermediate transfer belt 8.

Thereafter, with predetermined timing, a sheet S1 or S2 is fed from the sheet cassette 16 or the manual sheet feed portion 26 to the main conveyance passage 28, passes through the pair of registration rollers 12, and is conveyed to the secondary transfer nip N. The tonner images on the intermediate tranter belt 8 are then secondarily transferred to the sheet S1 or S2. The sheet S1 or S2 is then conveyed to the fixing device 13, and is heated and pressed by a pair of fixing rollers 13*a* in the fixing device 13 so that the tonner images are fixed to the surface of the sheet S1 or S2.

In a case where the sheet S1 or S2 is subjected to simplex printing, the branch portion 14 distributes the sheet S1 or S2 having passed through the fixing device 13 to the sheet discharge port 15. The sheet S1 or S2 having reached the sheet discharge port 15 is discharged onto a sheet discharge tray 17 by the pair of discharge rollers 22.

In a case where the sheet 1 or S2 is subjected to duplex printing, the branch portion 14 distributes the sheet S1 or S2 having passed through the fixing device 13 to the duplex conveyance passage 18. The duplex conveyance 18 conveys the sheet S1 or S2, while reversing it topside down, once again to the pair of registration rollers 12. The sheet S1 or S2 passes through the secondary transfer nip N and the fixing device 13 once again so that toner images are fixed to its reverse side and is then distributed to the sheet discharge port 15 by the branch portion 14.

2. Configuration of the Manual Sheet Feed Portion

Figure 2:
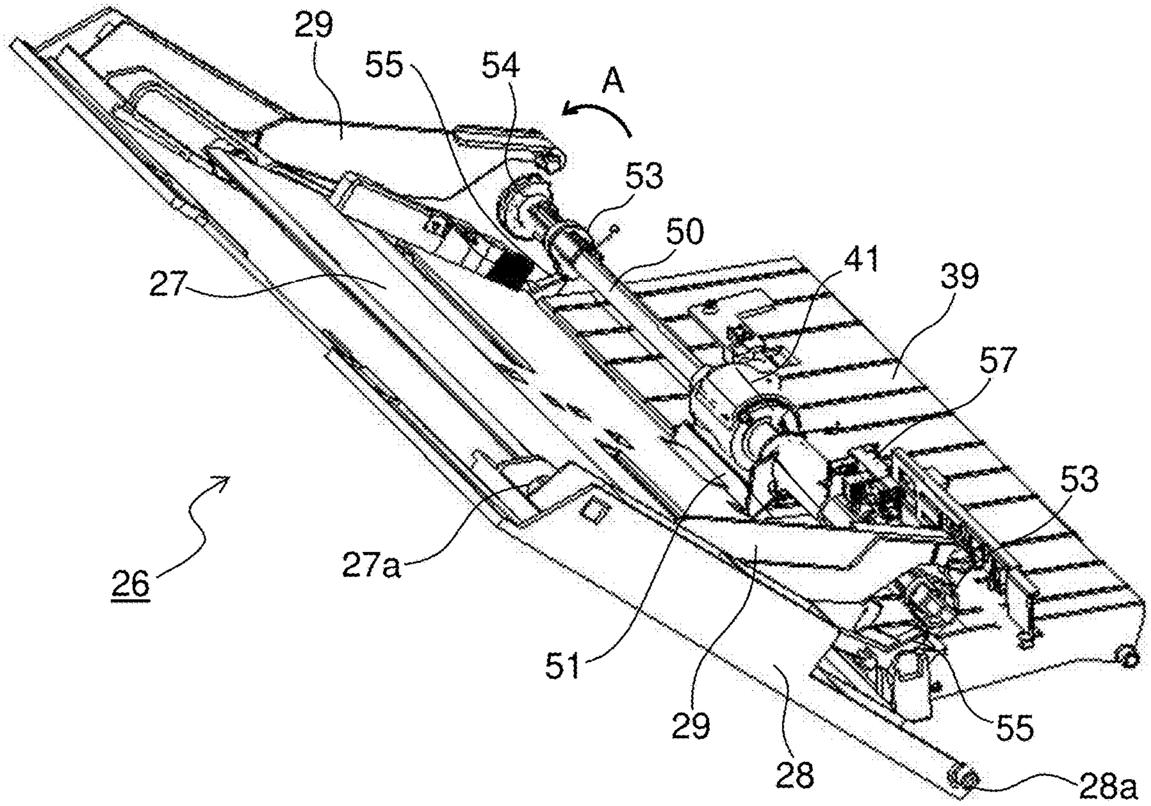
FIG. 2 is a perspective view of the manual sheet feed portion according to a first embodiment of the present disclosure.
Figure 3:
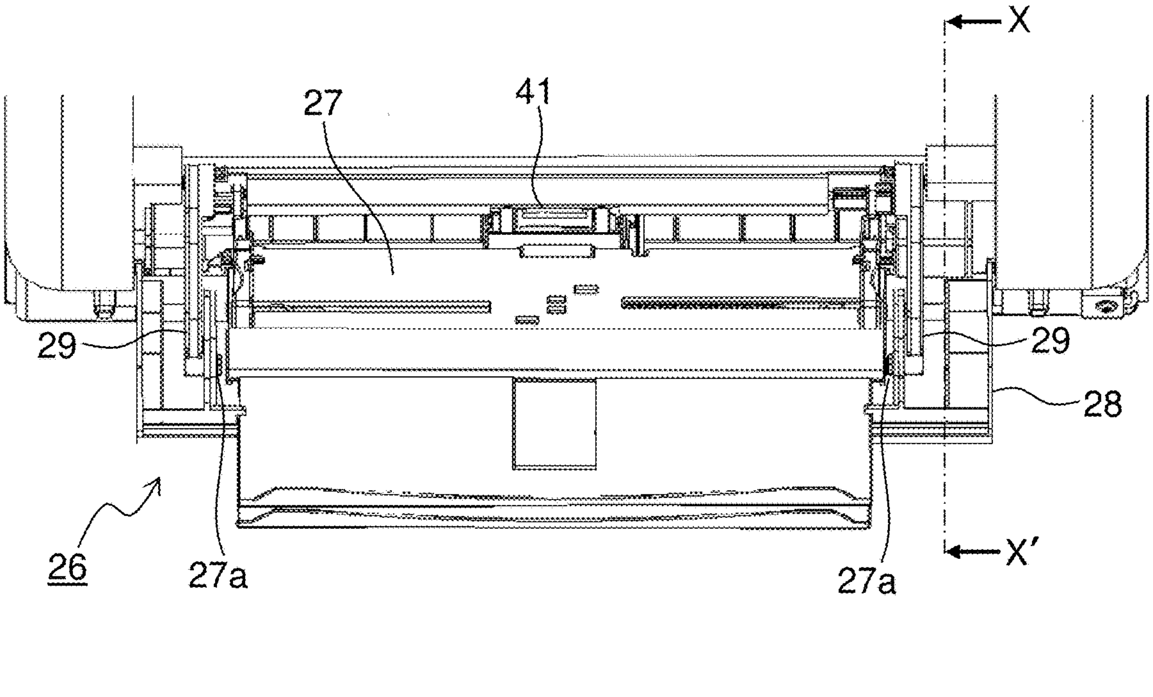
FIG. 3 is a front view of the manual sheet feed portion of the first embodiment as seen from upstream in the sheet feed direction.
Figure 4:
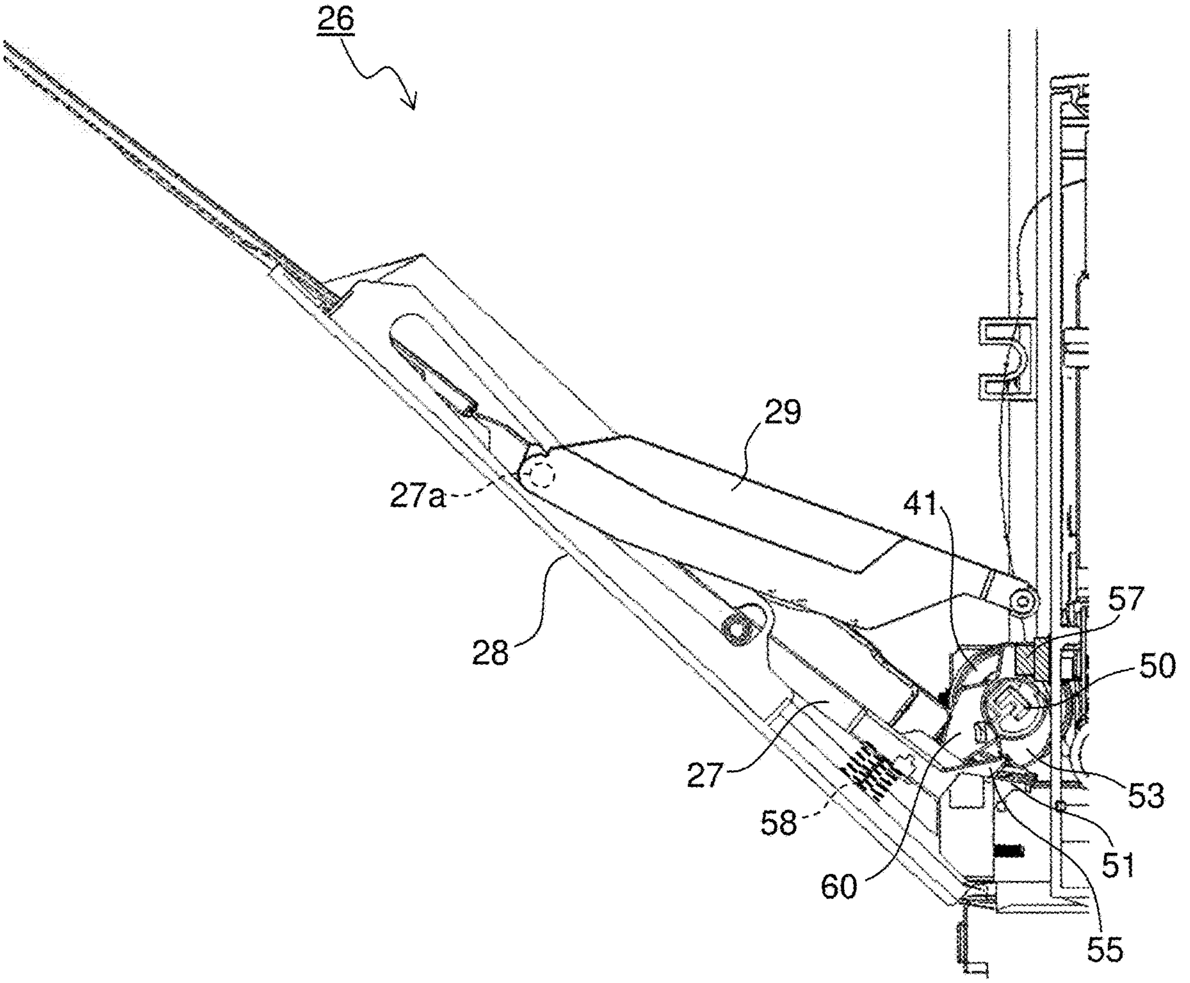
FIG. 4 is a side sectional view of the manual sheet feed portion of the first embodiment.

FIG. 2 is a perspective view of the manual sheet feed portion 26 according to a first embodiment of the present disclosure. FIG. 3 is a front view of the manual sheet feed portion 26 of the first embodiment as seen from upstream in the sheet feed direction. FIG. 4 is a side sectional view of the manual sheet feed portion 26 of the first embodiment (a sectional view from the direction of arrows XX' in FIG. 3). As shown in FIG. 2, the manual sheet feed portion 26 includes an MPF tray 27, a tray support cover 28, the sheet feed roller 41, a separation pad 51, and a sheet detection sensor 57.

The MPF tray 27 is swingably supported on the tray support cover 28 at a swing pivot 27*a* upstream with respect to the sheet feeding direction (the left to right direction in FIG. 4) and a downstream end part of it with respect to the sheet feeding direction moves up and down. The tray support cover 28 is supported on the apparatus body 7 at a pivot shaft 28*a* upstream with respect to the sheet feeding direction so as to be openable and closable. Support arms 29 are coupled to opposite end parts the tray support cover 28 in the width direction. The support arms 29 restrict the opening angle of the tray support cover 28.

An urging spring 58 is disposed between the MPF tray 27 and the tray support cover 28. The MPF tray 27 is urged by the urging spring 58 in the direction away from the tray support cover 28 (i.e., upward).

A shaft 50 is disposed near a downstream end part of the MPF tray 27 with respect to the sheet feed direction. The shaft 50 is rotatably pivoted on a bearing in a main frame of the imaging forming apparatus 100. A sheet feed roller 41 that feeds a sheet S2 (not shown in FIGS. 2 to 4) stacked in the MPF tray 27 is fixed to a substantially middle part of the shaft 50 in the axial direction. The sheet feed roller 41 has a feed surface 41*a* (see FIG. 5) made of rubber in a half-moon shape as seen in a section.

In an upstream end part of the manual sheet feed passage 39 with respect to the sheet feed direction, the separation pad 51 is disposed at a position facing the sheet feed roller 41. The separation pad 51 has its surface formed of a member with high surface friction. The separation pad 51 contacts the feed surface 41*a* of the sheet feed roller 41 to form a feed nip. As the feed surface 41*a* of the sheet feed roller 41 rotates while in contact with a bundle of sheets S2 stacked in the MPF tray 27, through between it and the separation pad 51, only the uppermost sheet S2 is separated and fed out.

Comma-shaped eccentric cams 53, whose maximum eccentric radius is larger than the radius of the sheet feed roller 41, are fixed to opposite end parts of the shaft 50. In addition, a drive input gear 54 with some of its teeth removed in part of its circumference surface is attached to one end part of the shaft 50. The drive input gear 54 meshes with a drive output gear driven to rotate by a drive motor (neither is shown).

When a sheet S2 is fed, by the control portion 102 (see FIG. 1) the driving force of the drive motor is transmitted to the drive input gear 54 with predetermined timing, and the rotation shaft 50 rotates so that the sheet feed roller 41 and the eccentric cam 53 make one turn in the direction of arrow A. At a position facing the eccentric cam 53 at the opposite ends of the MPF tray 27, cam followers 55 that can make contact with the eccentric cams 53 are provided so as to protrude upward.

A sheet detection sensor 57 is disposed above the shaft 50. Now, a description will be given of the configuration for detecting the presence or absence of the sheet S2 with the sheet detection sensor 57.

Figure 5:
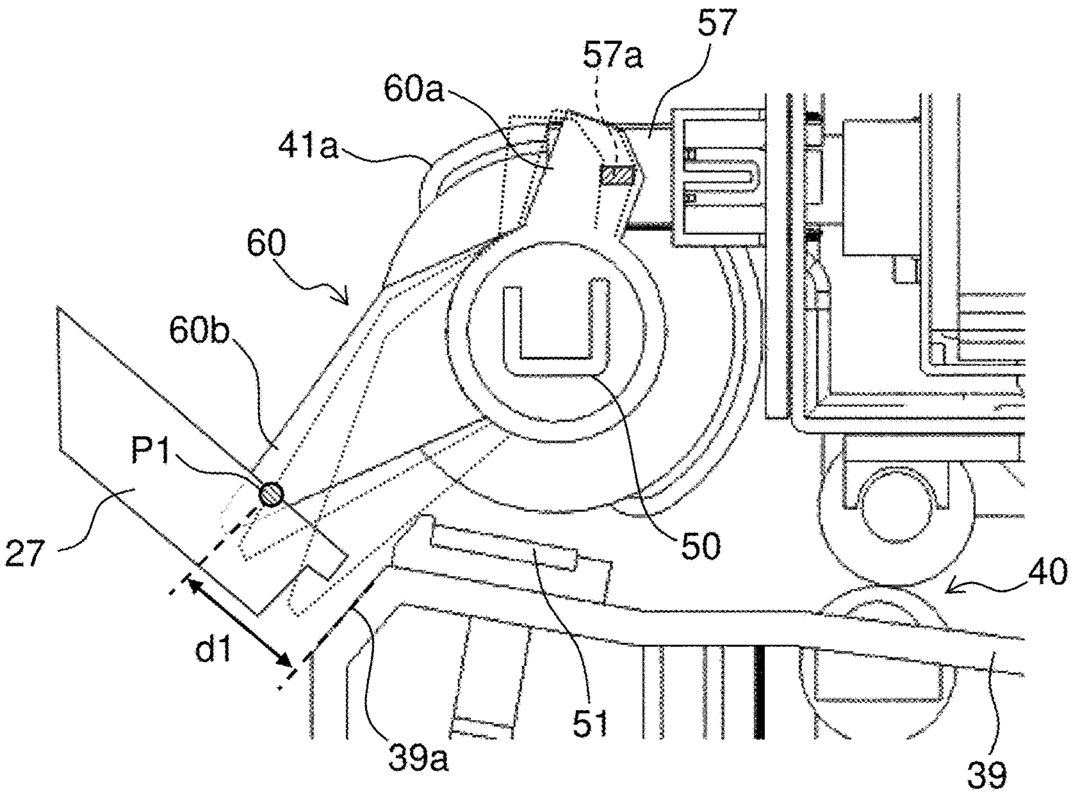
FIG. 5 is an enlarged view around the sheet detection sensor in FIG. 4, as seen from the axial direction of the shaft.

FIG. 5 is an enlarged view around the sheet detection sensor 57 in FIG. 4 as seen from the axial direction of the shaft 50. As shown in FIG. 5, the sheet detection sensor 57 is a PI (photo interrupter) sensor including a detection portion 57*a* having a light receiving portion and a light emitting portion arranged opposite each other.

The shaft 50 is fitted with a detection member 60 at a position opposite the sheet detection sensor 57. The detection member 60 has a light-shielding portion 60*a* and a contact portion 60*b*. The detection member 60 is rotatable with respect to the shaft 50 and its axial movement is restricted. The sheet detection sensor 57 and the detection member 60 constitute a sheet detection mechanism for detecting the presence or absence of a sheet S2 on the MPF tray 27.

In an upstream end part of the manual sheet feed passage 39, a sheet stop portion 39*a* is formed. When a sheet S2 is stacked on the MPF tray 27, the leading end of the sheet S2 is thrust against the sheet stop portion 39*a* to be aligned so that the sheet S2 is placed at a feeding position.

When no sheet S2 is stacked on the MPF tray 27, the contact portion 60*b* hangs at the lowest position under its own weight. In this state, where the light-shielding portion 60*a* is not inserted between the light-receiving portion and light-emitting portion of the detection portion 57*a*, the detection signal of the detection portion 57*a* is in HIGH state (light-transmitting state).

When a sheet S2 is stacked on the MPF tray 27, the contact portion 60*b* is lifted by the sheet S2 and the detection member 60 rotates in the clockwise direction in FIG. 5. In this way, the light-shielding portion 60*a* is inserted between the light receiving and light emitting portions of the detection portion 57*a*, and the detection signal of the detection portion 57*a* turns to LOW state (light-shielded state). Based on this change in the detection signal, the control portion 102 detects the presence or absence of a sheet S2 on the MPF tray 27.

Here, the larger the area of the detection portion 57*a* along the moving direction of the light-shielding portion 60*a* (left-right direction in FIG. 5), the larger the distance (detectable distance) d1 from the position P1 (detection start position) where the light-shielding portion 60*a* starts shading the detection portion 57*a* to the sheet stop portion 39*a*. The detectable distance d1 is, with the leading end of the sheet S2 separated from the sheet stop portion 39*a*, the maximum distance between the position (detectable position) where the sheet S2 can be detected by the sheet detection mechanism and the sheet stop portion 39*a*. For example, to make the configuration around the MPF tray 27 compact (low-profile), disposing the detection portion 57*a* of the sheet detection sensor 57 horizontally as shown in FIG. 5 gives a large detectable distance d1. That is, the sheet S2 is detected even when the leading edge of the sheet S2 is away from the sheet stop portion 39*a* over the detectable distance d1.

3. Sheet Feeding Operation in Conventional Configuration

Figure 6:
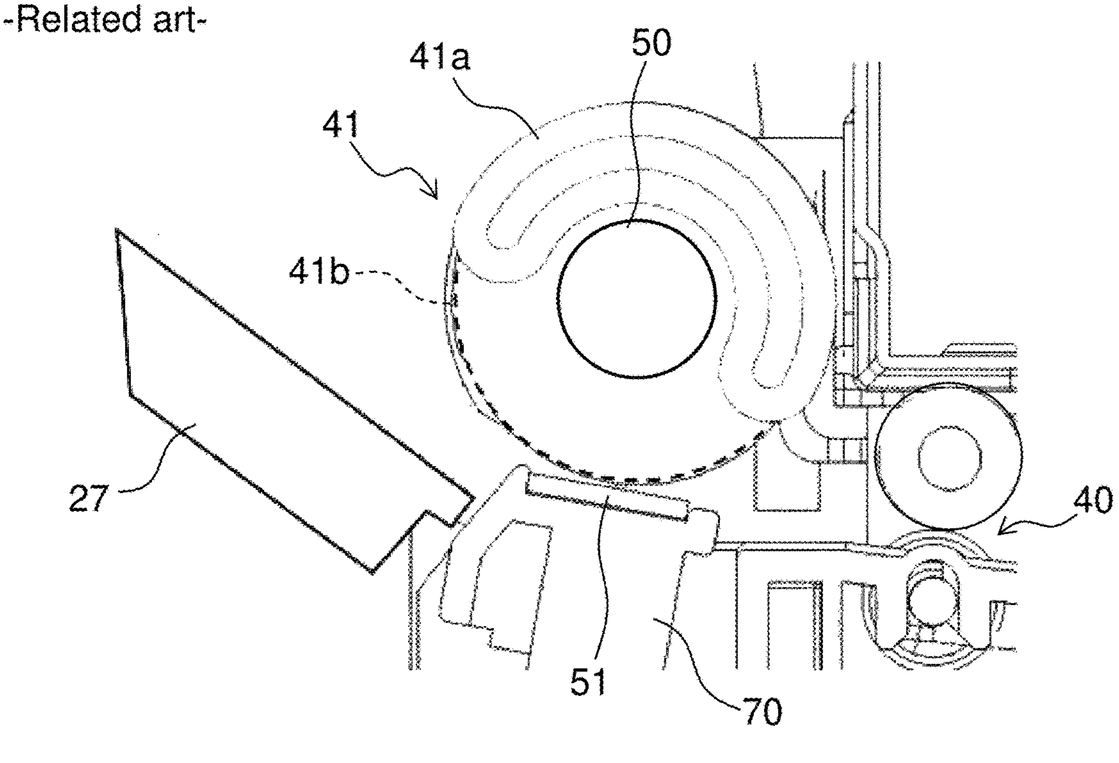
FIG. 6 a diagram illustrating sheet feeding operation in a conventional manual sheet feed portion, showing a state where an MPF tray is separated from a sheet feed roller.
Figure 7:
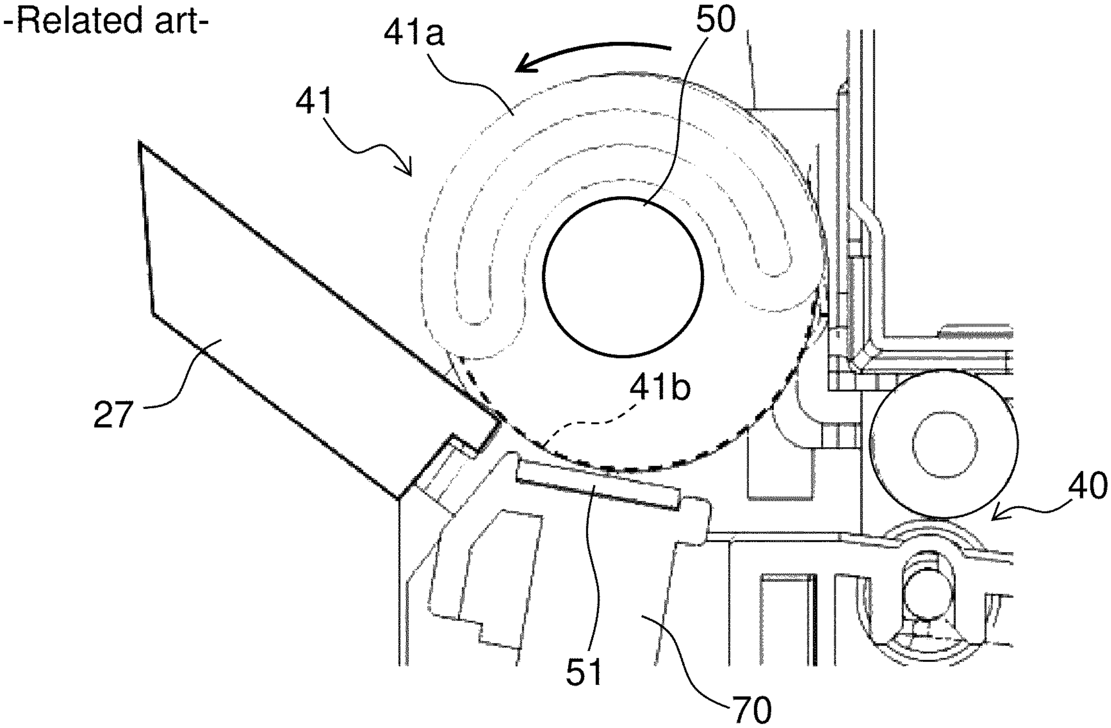
FIG. 7 is a diagram showing a state where, from the state in FIG. 6, the sheet feed roller and an eccentric cam have rotated by a predetermined amount and the MPF tray is about to contact the feed surface of the sheet feed roller.
Figure 8:
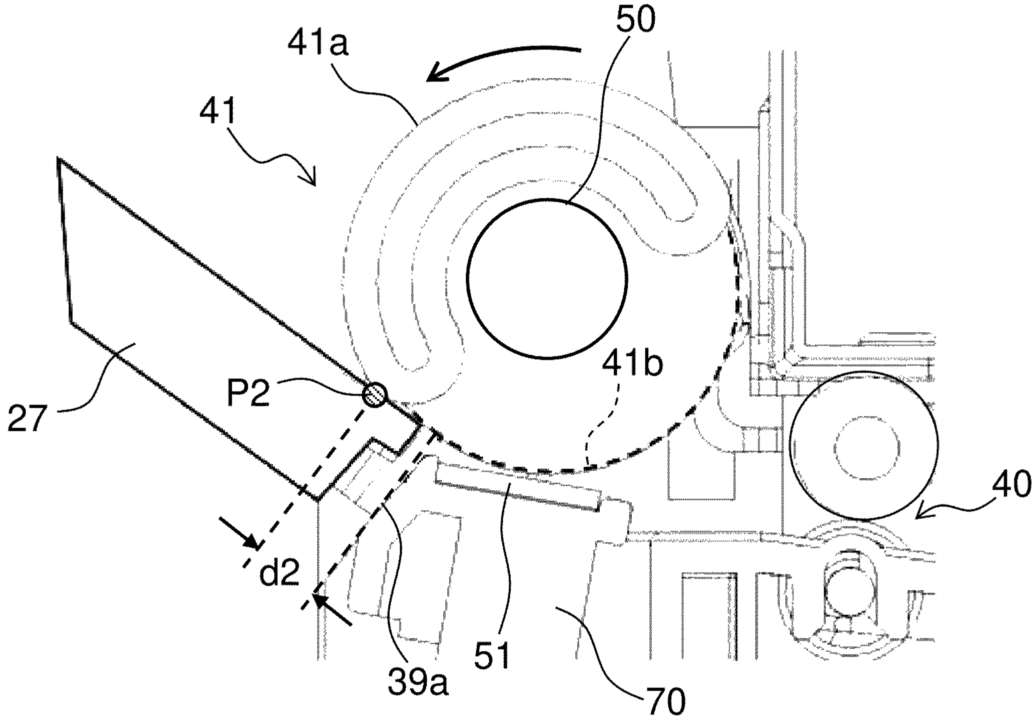
FIG. 8 is a diagram showing a state where, from the state shown in FIG. 7, the sheet feed roller and eccentric cam have rotated by a predetermined amount and the MPF tray is in contact with the feed surface of the sheet feed roller.

FIGS. 6 to 8 illustrate sheet feeding operation in a conventional manual sheet feed portion 26. In the conventional configuration, the sheet feed roller 41 has a half-moon-shaped feed surface 41*a* and a pair of pulleys 41*b* disposed at opposite sides of the feed surface 41*a* along the axial direction. The pulley 41*b* has a radius slightly smaller than the radius of the feed surface 41*a*. The separation pad 51 is fixed to the separation pad holder 70. The separation pad holder 70 is urged upward by a coil spring (not shown).

The pulley 41*b* restricts the height-direction position of the sheet S2 lifted to the feeding position by the rise of MPF tray 27. The pulley 41*b* also restricts, after the feed surface 41*a* has passed across the separation pad 51, the pressing-direction position of the separation pad 51 by rotating while in contact with the separation pad 51. The manual sheet feed passage 26 is otherwise configured similarly to that in the first embodiment shown in FIG. 2.

When the rotation shaft 50 rotates until the half-moon-shaped feed surface 41*a* of the sheet feed roller 41 moves off the feed position, the sheet S2 is nipped between the separation pad 51 and the pulley 41*b*. In order to reduce the conveyance load of the sheet S2 at this time, the pulley 41*b* is supported rotatably with respect to the shaft 50.

FIG. 6 shows the MPF tray 27 separated from the sheet feed roller 41. When a sheet S2 is fed from the manual sheet feed portion 26, the shaft 50 is rotated based on a control signal from the control portion 102 (see FIG. 1). As a result, from the state shown in FIG. 6, the sheet feed roller 41 and the eccentric cam 53 rotate by a predetermined amount and the MPF tray 27 rises.

When from the state in FIG. 6 the sheet feed roller 41 and the eccentric cam 53 rotate by a predetermined amount, as shown in FIG. 7, the MPF tray 27 rises and contacts the pulley 41*b* and the eccentric cam 53 and the cam follower 55 (see FIG. 2) separate from each other. In this state, the feed surface 41*a* of the sheet feed roller 41 has not made contact with the MPF tray 27 yet.

When from the state in FIG. 7 the sheet feed roller 41 and the eccentric cam 53 rotate further by a predetermined amount, as shown in FIG. 8, the feed surface 41*a* rotates to contact the MPF tray 27 to feed the sheet S2. At this time, if the leading end of the sheet S2 is within the distance d2 (feedable distance) from the contact position P2 (feed start position) between the feed surface 41*a* and the MPF tray 27 to the sheet stop portion 39*a*, then the sheet S2 can be fed.

As described above, if the detectable distance d1 (see FIG. 5) of the sheet detection sensor 57 is larger than the feedable distance d2, failure may occur in which, although the sheet S2 is detected to be stacked on the MPF tray 27, it cannot be fed."

In order to increase the feedable distance d2 in the conventional configuration shown in FIGS. 6 to 8, the position of the MPF tray 27 immediately before making contact with the feed surface 41*a* of the sheet feed roller 41 can be made radially more inward (to inward of the outer circumferential surface of the feed surface 41*a*) so that the feed surface 41*a* can be brought into contact with the MPF tray 27 from further upstream of it than the feed start position P2 in FIG. 8. One possible way to achieve that is to give the pulley 41*b* a smaller outer diameter.

However, in the conventional configuration, the pulley 41*b* also serves to restrict the position of the separation pad 51 by contacting the separation pad 51 after the passage of the feed surface 41*a*. Thus, giving pulley 41*b* a smaller outer diameter may inconveniently result in a change in the position of the separation pad 51 after the passage of the feed surface 41*a*, causing failure to feed the sheet S2.

3. Sheet Feed Operation in the Configuration of This Embodiment

Figure 9:
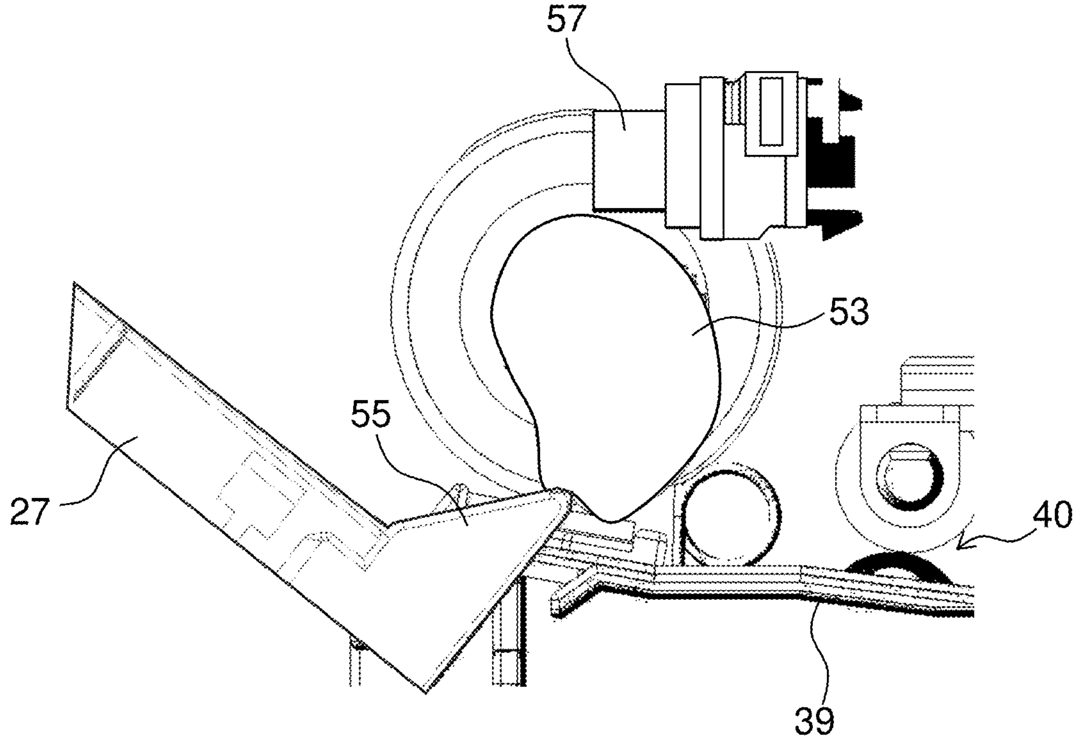
FIG. 9 is a side sectional view around the eccentric cam in the manual sheet feed portion of the first embodiment, showing a state where MPF tray is lowered to the lowest position.
Figure 10:
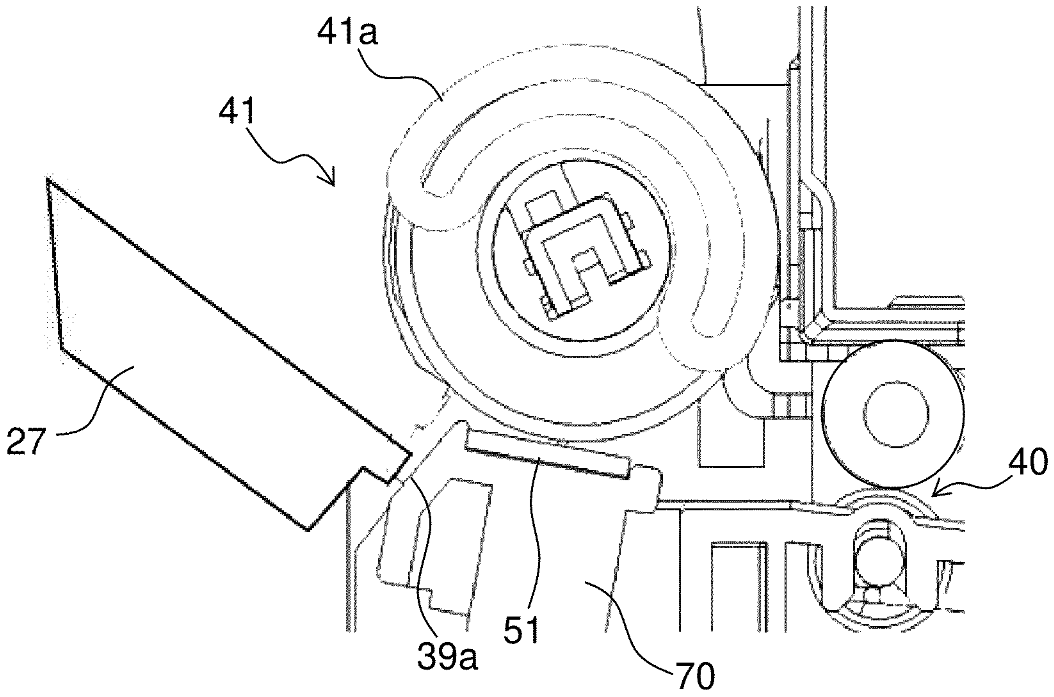
FIG. 10 is a side sectional view around the sheet feed roller in the state shown in FIG. 9, showing the positional relationship between the sheet feed roller and the MPF tray.
Figure 11:
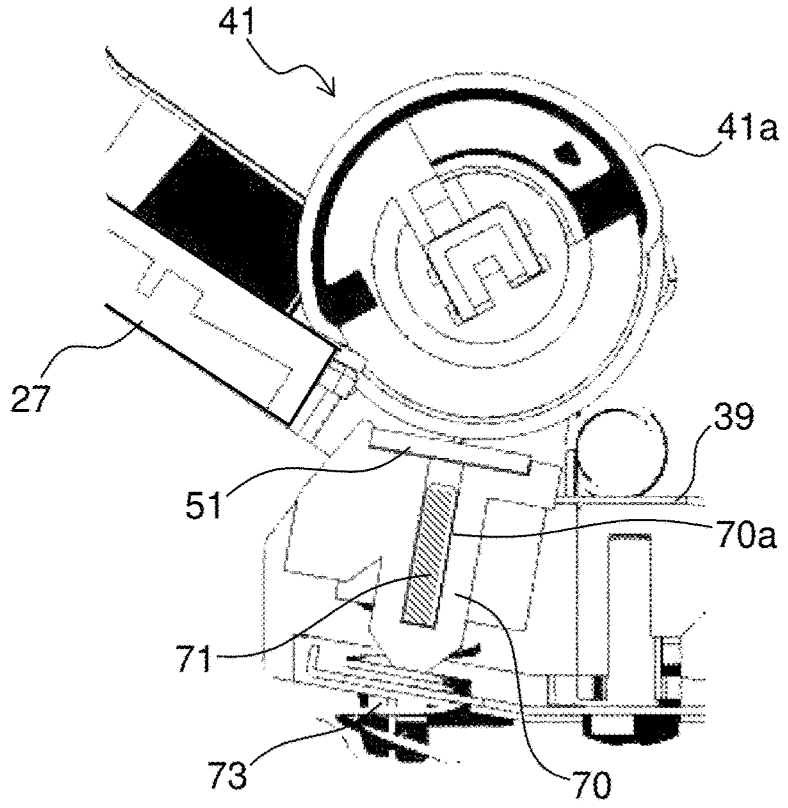
FIG. 11 is a side sectional view showing a positioning mechanism for a separation pad in the manual sheet feed portion of the first embodiment.

FIG. 9 is an enlarged side view around the eccentric cam 53 in the manual sheet feed portion 26 of the first embodiment in a state where MPF tray 27 is lowered to the lowest position. FIG. 10 is a side sectional view showing the positional relationship between the sheet feed roller 41 and the MPF tray 27 in the state shown in FIG. 9. FIG. 11 is a diagram showing a positioning mechanism for the separation pad 51 in the manual sheet feed portion 26 of the first embodiment.

FIG. 9, and also FIGS. 12 and 14, which will be referred to later, is an enlarged perspective view of the eccentric cam 53 and the cam follower 55 located at the near side in FIG. 2 as viewed from outside. The configuration of the eccentric cam 53 and the cam follower 55 located at the far side in FIG. 2 have quite the same configuration and therefore no separate description will be given.

As shown in FIG. 10, in this embodiment, no pulley 41*b* (see FIG. 4) is provided, and the sheet feed roller 41 is composed only of a half-moon-shaped feed surface 41*a*. Thus, the position of the MPF tray 27 is determined only with the outer diameter of the eccentric cam 53 at the position where the cam follower 55 contacts it. As shown in FIG. 9, a large-diameter portion of the eccentric cam 53 makes contact with the cam followers 55 provided at the opposite ends of the MPF tray 27 in the width direction. Thus, in FIG. 10, the MPF tray 27 is separated from the outer circumference surface the sheet feed roller 41 (feed surface 41*a*) radially outward.

In this embodiment, with no pulley 41*b*, the position of the separation pad 51 after the passage of the feed surface 41*a* cannot be restricted with a pulley 41*b*. Thus, a configuration is employed where the position of the separation pad 51 after the passage of the feed surface 41*a* is determined by another positioning shape.

Specifically, as shown in FIG. 11, guide grooves 70*a* extending in the up-down direction are provided in opposite end parts of the separation pad holder 70 in the longitudinal direction (perpendicular to the plane of FIG. 11) where the separation pad 51 is fixed. Support ribs 71 formed on the manual sheet feed portion 39 are slidably engaged in the guide grooves 70*a*. The separation pad holder 70 is urged upward by a coil spring 73.

With the configuration shown in FIG. 11, contact between a lower end part of the guide groove 70*a* and the support rib 71 restricts the upper limit position of the separation pad 51 after the passage of the feed surface 41*a*. This restricts a significant rise of the separation pad 51 after the passage of the feed surface 41*a*, thereby preventing failure to feed the sheet S2.

Next, the feeding operation for the sheet S2 in the manual sheet feed portion 26 of the first embodiment will be described. FIG. 12 is an enlarged side view around the eccentric cam 53 in the manual sheet feed portion 26 of the first embodiment, showing a state where from the state shown in FIG. 9 the MPF tray 27 is raised. FIG. 13 is a side sectional view around the sheet feed roller 41 in the state in FIG. 12, showing the positional relationship between the sheet feed roller 41 and the MPF tray 27.

When from the state in FIG. 9 the shaft 50 rotates by a predetermined amount in the counter-clockwise direction (sheet feeding direction), the eccentric cam 53 rotates by a predetermined amount and the contact position between the eccentric cam 53 and the cam follower 55 moves from the large-diameter portion to a small-diameter portion of the eccentric cam 53. Since the sheet feed roller 41 is not provided with a pulley 41*b*, the MPF tray 27 rises to the position in FIG. 12 while keeping the contact between the eccentric cam 53 and the cam follower 55. Thus, the uppermost position of the MPF tray 27 is determined solely by the contact position between the eccentric cam 53 and the cam follower 55.

Thus, as shown in FIG. 13, the MPF tray 27 can be kept on standby at a standby position radially more inward with respect to the sheet feed roller 41 (inward of the outer circumferential surface of the feed surface 41*a*) than in the conventional configuration (see FIG. 7). In the state in FIG. 13, the feed surface 41*a* is not yet in contact with the top surface of the MPF tray 27.

Figure 12:
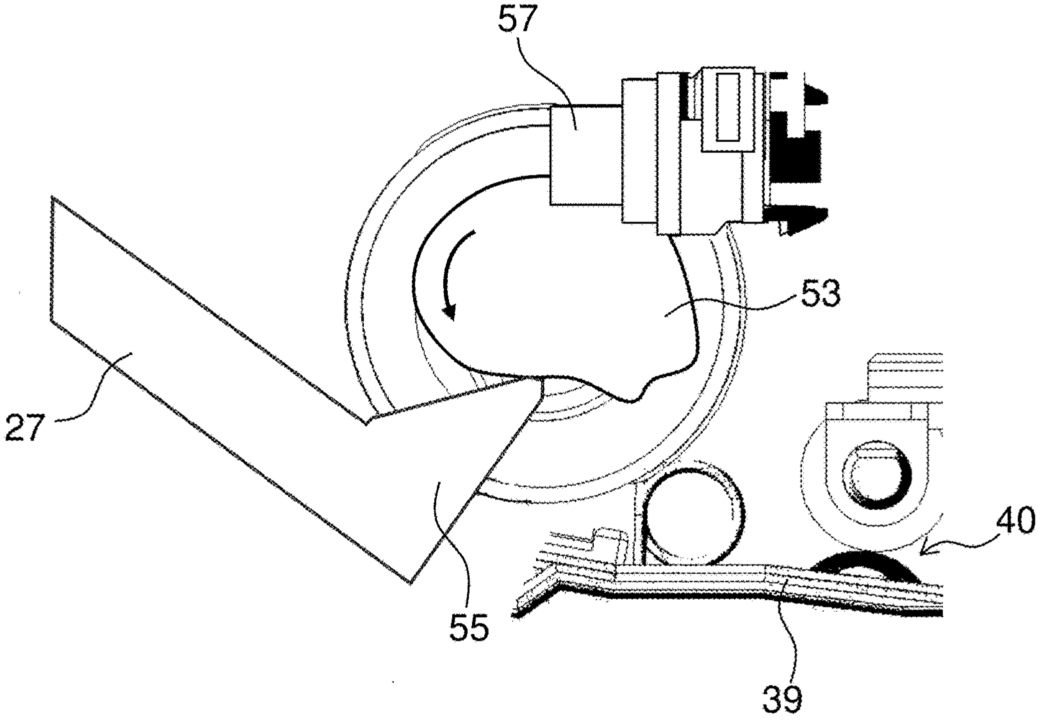
FIG. 12 is an enlarged side view around the eccentric cam in the manual feeder of the first embodiment, showing a state in which MPF tray is raised from the state shown in FIG. 9.
Figure 13:
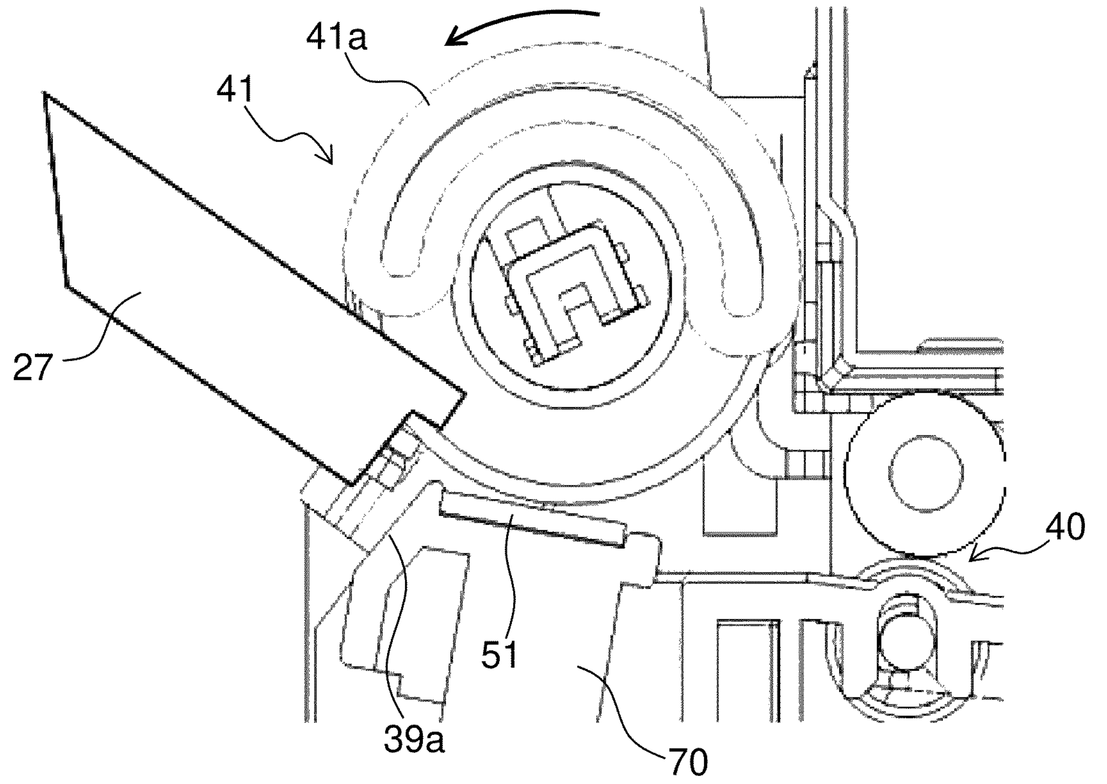
FIG. 13 is a side sectional view around the sheet feed roller in the state in FIG. 12, showing the positional relationship between the sheet feed roller and the MPF tray.
Figure 14:
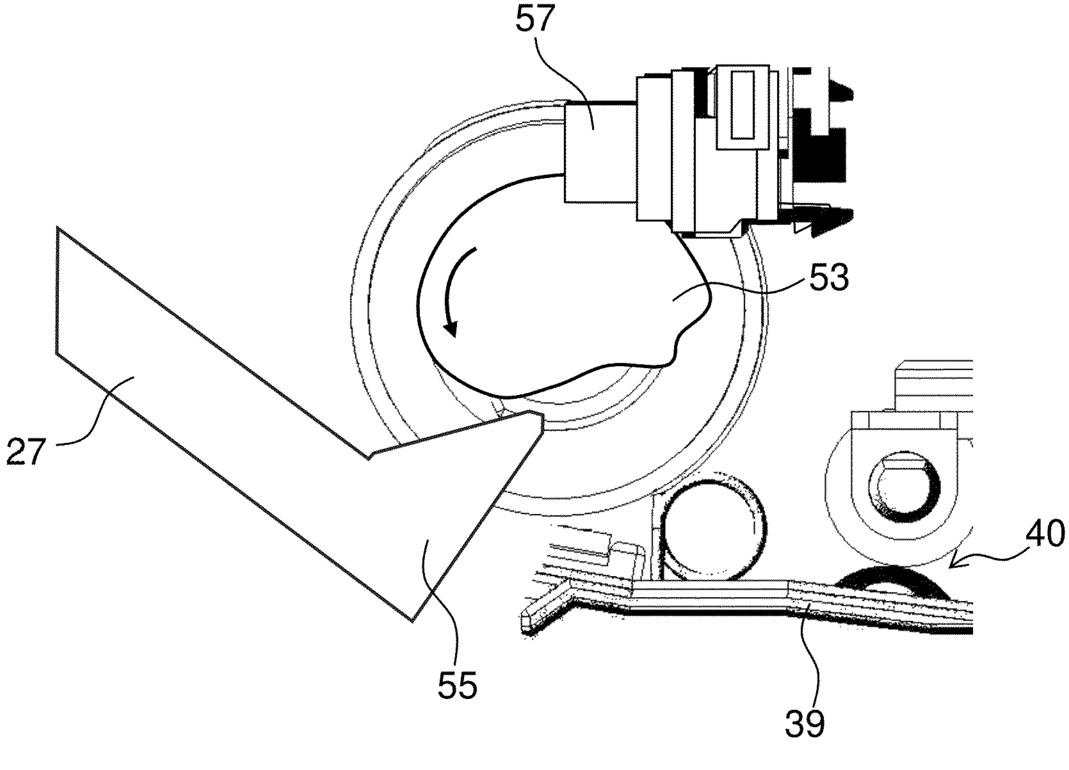
FIG. 14 is an enlarged side view around the eccentric cam in the manual sheet feed portion of the first embodiment, showing a state where the MPF tray is raised further from the state in FIG. 11.
Figure 15:
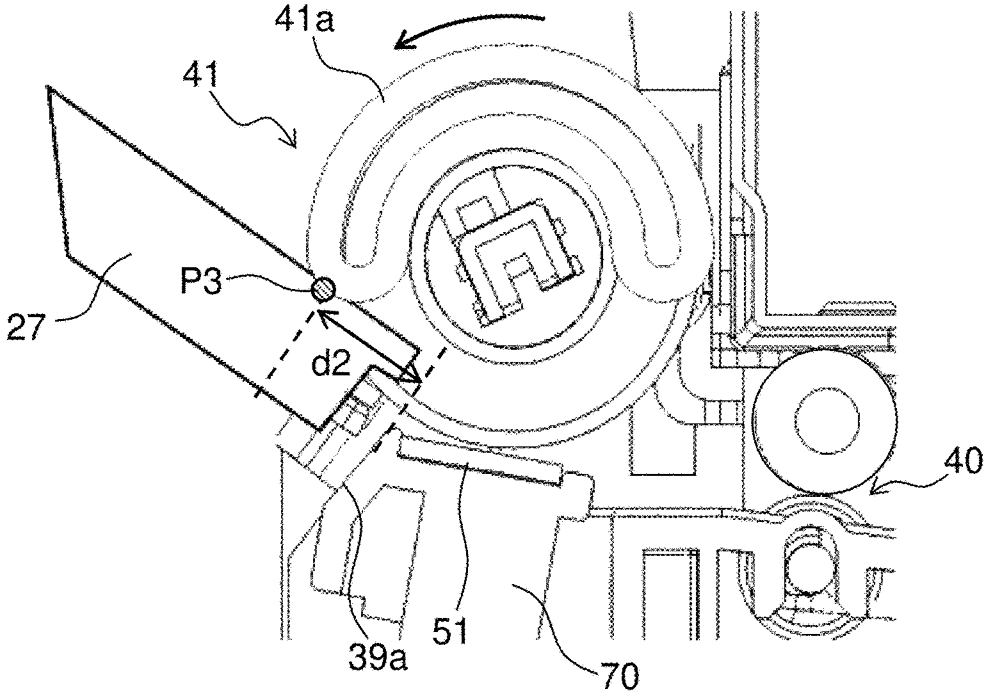
FIG. 15 is a side sectional view around the sheet feed roller in the state in FIG. 14, showing the positional relationship between the sheet feed roller and the MPF tray.

FIG. 14 is an enlarged side view around the eccentric cam 53 in the manual sheet feed portion 26 of the first embodiment, showing a state where from the state in FIG. 12 the MPF tray 27 is raised. FIG. 15 is a side sectional view around the sheet feed roller 41 in the state in FIG. 14, showing the positional relationship between the sheet feed roller 41 and the MPF tray 27.

When from the state in FIG. 12 the shaft 50 further rotates a predetermined amount in the counter-clockwise direction (sheet feeding direction), the eccentric cam 53 rotates a predetermined amount and, as shown in FIG. 14, the cam follower 55 separates from the eccentric cam 53. On the other hand, as shown in FIG. 15, the feed surface 41*a* rotates from the position in FIG. 13 further in the counter-clockwise direction to contact the top surface of the MPF tray 27. This makes the feeding of the sheet S2 possible.

At this time, the contact position (feeding start position) P3 between the feed surface 41*a* and the MPF tray 27 is a position radially more inward with respect to the sheet feed roller 41 than the contact position (feeding start position) P2 in the conventional configuration (see FIG. 8). Thus, the distance d2 (feedable distance) from the feed start position P3 to the sheet stop portion 39*a* is longer than in the conventional configuration.

With the configuration of this embodiment, the feedable distance d2 when a sheet S2 is fed from the MPF tray 27 can be made longer than the detectable distance d1 of the sheet detection sensor 57. It is thus possible to prevent a situation where sheet S2 is not fed even though sheet S2 is detected by the sheet detection sensor 57 and thereby suppress discomfort to the user.

Even in a case where the detection portion 57*a* of the sheet detection sensor 57 is disposed horizontally (for an increased detectable distance d1) from the standpoint of space saving, the feedable distance d2 can be made longer than the detectable distance d1, and this helps achieve a space-saving (low-profile) configuration around the MPF tray 27.

Moreover, with the configuration of this embodiment, the upper limit position of the separation pad 51 is restricted by the contact between the lower end part of the guide groove 70*a* formed in the separation pad holder 70 and the support rib 71. Thus, the upper limit position of the separation pad 51 after the passage of the feed surface 41*a* can be restricted without a pulley 41*b*, and this helps prevent failure to feed the sheet S2 due to a change in the position of the separation pad 51.

Figure 16:
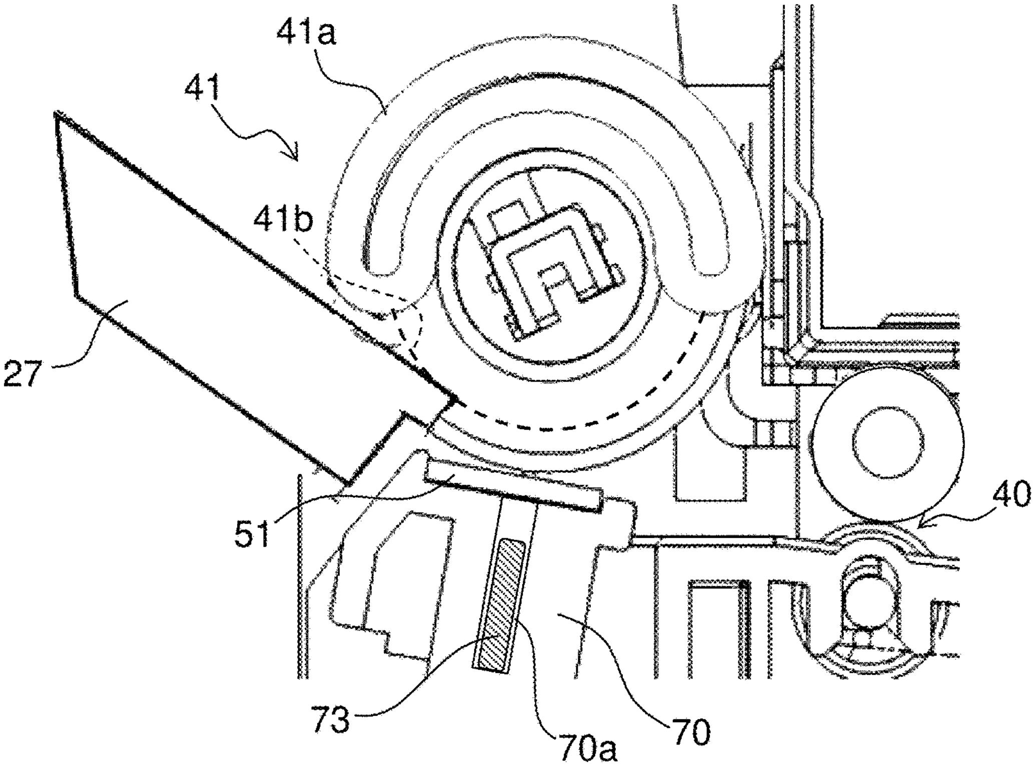
FIG. 16 is a side sectional view around the sheet feed roller in the manual sheet feed portion of a second embodiment of the present disclosure, showing the positional relationship between the sheet feed roller and the MPF tray.

FIG. 16 is a side sectional view around the sheet feed roller 41 in the manual sheet feed portion 26 of a second embodiment of the present disclosure, showing the positional relationship between the sheet feed roller 41 and the MPF tray 27. In this embodiment, the sheet feed roller 41 has a half-moon-shaped feed surface 41*a* and a pulley 41*b*. The manual sheet feed portion 26 is otherwise configured similarly to that of the first embodiment. As shown in FIG. 16, the pulley 41*b* restricts the position of MPF tray 27 raised to the feeding position by the rotation of eccentric cam 53 (see FIG. 2).

In this embodiment, the outer diameter of the pulley 41*b* is smaller than in the conventional configuration (see FIG. 6). More specifically, the outer diameter of the pulley 41*b* is much smaller than the outer diameter of feed surface 41*a* so that the standby position of the MPF tray 27 immediately before it rises to the feed position and makes contact with the feed surface 41*a* is a position radially inward of the outer circumference of sheet feed roller 41.

Since the outer diameter of pulley 41*b* is smaller, when the upper limit position of the separation pad 51 is restricted with a pulley 41*b* as in the conventional configuration, the position of the separation pad 51 changes after the passage of the feed surface 41*a*, causing failure to feed the sheet S2. To avoid that, in this embodiment, as in the first embodiment, the upper limit position of the separation pad 51 is restricted with the guide groove 70*a* formed in the separation pad holder 70 and the support rib 71 (see FIG. 11).

With the configuration of this embodiment, as in the first embodiment, the feedable distance d2 when a sheet S2 is fed from the manual sheet feed portion 26 can be made longer than the detectable distance d1 of the sheet detection sensor 57. Also, the upper limit position of the separation pad 51 after the passage of the feed surface 41*a* can be restricted without the separation pad 51 making contact with the pulley 41*b*.

The embodiments described above are not meant to limit the scope of the present disclosure, which thus allows for any modifications without departure from the spirit of what is disclosed herein. For example, in the above embodiments, a PI (photointerrupter) sensor including a detection portion 57*a* having a light-receiving portion and a light-emitting portion disposed to face each other is used as an example of the sheet detection sensor 57; instead a reflective optical sensor having a light-receiving portion and a light-emitting portion disposed at the same side can be used as the sheet detection sensor 57. In this case, a reflective portion is provided in place of the light-shielding portion 60*a* of the detection member 60, and the detection light emitted from the light-emitting portion is reflected by the reflective portion and is detected by the light-receiving portion; thus the sheet S2 on the MPF tray 27 can be detected.

Even when a reflective optical sensor is used, the detectable distance d1 may be large depending on the arrangement and size of the light-receiving portion. Thus, it is effective to apply the present disclosure as when a PI (photointerrupter) sensor is used.

In the embodiments described above, an electrophotographic color printer is taken as an example of the image forming apparatus 100; instead, monochrome printers, color and monochrome copiers, and inkjet recording printers can also be used as the image forming apparatus 100.

The present disclosure is applicable to a sheet feeding device that feeds sheets such as sheets of paper. Based on the present disclosure, it is possible to provide a sheet feeding device capable of extending the feedable distance for sheets with a simple configuration when using a sheet feed roller having a half-moon-shaped feed surface, and to provide an image forming apparatus incorporating such a sheet feeding device.

What is claimed is:

1. A sheet feeding device comprising:

a sheet stacking tray on which a sheet is stacked, the sheet stacking tray being movable up and down;

a sheet stop portion against which a leading end of the sheet stacked on the sheet stacking tray is thrust to be aligned;

a sheet feed roller in pressed contact with a top surface of the sheet stacked on the sheet stacking tray, the sheet feed roller having a half-moon-shaped feed surface that feeds out the sheet in a feed direction, without any additional feed surface;

a separation member that contacts the feed surface of the sheet feed roller to form a feed nip;

a first urging member that urges the sheet stacking tray in a direction toward the sheet feed roller;

an eccentric cam that is fixed to a rotating shaft of the sheet feed roller, the eccentric cam having a maximum eccentric radius larger a radius of the sheet feed roller;

a cam follower provided at a position in the sheet stacking tray where the cam follower contacts the eccentric cam, the cam follower raising the sheet stacking tray by moving a contact point from a large-diameter portion of the eccentric cam to a small-diameter portion of the eccentric cam as the eccentric cam rotates;

a sheet detection mechanism that detects presence or absence of the sheet stacked on the sheet stacking tray, the detection mechanism including:

a sheet detection sensor that includes a detection portion having a light emitting portion and a light receiving portion; and a detection member that makes contact with the sheet stacked on the sheet stacking tray to swing, the detection member having a light-shielding portion that shields or opens an optical path of the detection portion; and a holding mechanism including:

a holder holding the separation member and movable in a direction toward or away from the sheet feed roller:

a second urging member that urges the holder in a direction toward the sheet feed roller;

a guide groove formed along a movement direction of the holder; and a support rib slidably engaged in the guide groove, the holding mechanism holding the separation member at a position away from the sheet feed roller as a result of an end part of the guide groove and the support rib making contact with each other after the feed surface has passed across the separation member as the sheet feed roller rotates, wherein, immediately before the sheet starts to be fed, the sheet stacking tray is kept on standby at a standby position radially inward of an outer diameter of the feed surface so that a feedable distance that is a distance between a feed start position at which the feed surface and the sheet stacking tray are in contact with each other and the sheet stop portion is larger than a detectable distance that is a maximum distance between a detectable position at which, with the leading end of the sheet separated from the sheet stop portion, the sheet can be detected by the sheet detection mechanism and the sheet stop portion.

2. The sheet feeding device according to claim 1, wherein the sheet feed roller only has the feed surface, and the sheet stacking tray rises to the standby position while keeping contact between the eccentric cam and the cam follower.

3. The sheet feeding device according to claim 1, wherein the sheet feed roller includes:

the feed surface; and pulleys disposed at opposite sides of the feed surface along an axial direction, the pulleys having a smaller outer diameter than the feed surface, and the sheet stacking tray is disposed at the standby position in contact with an outer circumference surface of the pulleys.

4. The sheet feeding device according to claim 1, wherein the sheet detection sensor is disposed in such a direction as to increase an area of the detection portion in a movement direction of the light shielding-portion.

5. An image forming apparatus comprising:

an image forming portion that forms an image on a sheet; and the sheet feeding device according to claim 1 that feeds the sheet to the image forming portion.

* * * * *